(12) United States Patent
Kawahara

(10) Patent No.: US 10,565,135 B2
(45) Date of Patent: Feb. 18, 2020

(54) INFORMATION PROCESSING DEVICE, INFORMATION PROCESSING METHOD, MAIN PROCESSOR CORE, PROGRAM, INFORMATION PROCESSING METHOD, AND SUB PROCESSOR CORE

(71) Applicant: NEC CORPORATION, Tokyo (JP)

(72) Inventor: Aoi Kawahara, Tokyo (JP)

(73) Assignee: NEC Corporation, Tokyo (JP)

( * ) Notice: Subject to any disclaimer, the term of this patent is extended or adjusted under 35 U.S.C. 154(b) by 12 days.

(21) Appl. No.: 15/552,179

(22) PCT Filed: Dec. 28, 2015

(86) PCT No.: PCT/JP2015/006491
§ 371 (c)(1),
(2) Date: Aug. 18, 2017

(87) PCT Pub. No.: WO2016/132416
PCT Pub. Date: Aug. 25, 2016

(65) Prior Publication Data
US 2018/0074980 A1    Mar. 15, 2018

(30) Foreign Application Priority Data
Feb. 19, 2015    (JP) .................. 2015-030566

(51) Int. Cl.
G06F 12/00    (2006.01)
G06F 13/16    (2006.01)
(Continued)

(52) U.S. Cl.
CPC .......... *G06F 13/1689* (2013.01); *G06F 3/065* (2013.01); *G06F 3/067* (2013.01);
(Continued)

(58) Field of Classification Search
CPC ...................................................... G06F 12/00
(Continued)

(56) References Cited

U.S. PATENT DOCUMENTS 6,332,180 B1 * 12/2001 Kauffman ............. G06F 9/5077
711/153
8,473,683 B2    6/2013 Gara et al.
(Continued)

FOREIGN PATENT DOCUMENTS

CN    103152390 A    6/2013
CN    103559095 A    2/2014
(Continued)

OTHER PUBLICATIONS

International Search Report dated Mar. 29, 2016, in corresponding PCT International Application.
(Continued)

*Primary Examiner* — Gautam Sain
(74) *Attorney, Agent, or Firm* — Finnegan, Henderson, Farabow, Garrett & Dunner, L.L.P.

(57) ABSTRACT

A main processor core having a first memory and a sub processor core having a second memory and controlled by the main processor core are included. An operating system is incorporated in the main processor core, and no operating system is incorporated in the sub processor core. Shared memories are formed in the first and second memories, respectively. Data in the shared memories of the first and second memories are synchronized. The main processor core is configured to synchronize the data in the shared memories formed in the first and second memories while the sub processor core stops operating.

9 Claims, 14 Drawing Sheets

(51) Int. Cl.
    *G06F 3/06*     (2006.01)
    *G06F 9/50*     (2006.01)
    *G06F 9/54*     (2006.01)

(52) U.S. Cl.
    CPC .......... *G06F 3/0619* (2013.01); *G06F 9/5016* (2013.01); *G06F 9/544* (2013.01); *G06F 12/00* (2013.01); *G06F 13/1663* (2013.01)

(58) Field of Classification Search
    USPC ........................................................ 711/148
    See application file for complete search history.

(56) References Cited

U.S. PATENT DOCUMENTS

| | | | | |
|---|---|---|---|---|
| 2009/0083493 | A1* | 3/2009 | Kinter | G06F 12/0811 711/141 |
| 2009/0327610 | A1 | 12/2009 | David et al. | |
| 2015/0067369 | A1* | 3/2015 | Henry | G06F 1/04 713/323 |
| 2015/0286597 | A1* | 10/2015 | Vajapeyam | G06F 13/28 710/308 |
| 2016/0077970 | A1* | 3/2016 | Liu | G06F 12/084 711/121 |

FOREIGN PATENT DOCUMENTS

| | | |
|---|---|---|
| CN | 103959275 A | 7/2014 |
| JP | 2-12383 | 1/1990 |
| JP | 3-268158 | 11/1991 |
| JP | 9-269934 | 10/1997 |
| JP | 10-283333 | 10/1998 |
| JP | 11-272631 | 10/1999 |
| JP | 2008-165318 | 7/2008 |
| KR | 20080023634 | 3/2008 |
| KR | 20130058856 | 6/2013 |

OTHER PUBLICATIONS

Tamura et al.; "GPGPU Katsuyo no kihon o Manabu CUDA ni yoru Heiretsu Programming no Kiso" ASCII, technologies, Dec. 1, 2009 (Dec. 1, 2009), vol. 14, No. 12, whole No. 164, pp. 42-47, (2009).
Decision to Grant dated Apr. 25, 2016, by the Japanese Patent Office in counterpart Japanese Patent Application No. 2015-030566.
Korean Notice of Allowance, by the Korean Patent Office in counterpart Korean Patent Application No. 10-2017-7023002, dated Oct. 27, 2017.
Extended European Search Report from the European Patent Office dated Dec. 20, 2017, in counterpart European Patent Application No. 15882521.6.
Notification of First Office Action dated May 9, 2018, issued in counterpart Chinese Patent Application No. 201580075411.X.

* cited by examiner

KEEP MEMORY CONTENTS IDENTICAL BETWEEN PROCESS A AND PROCESS B

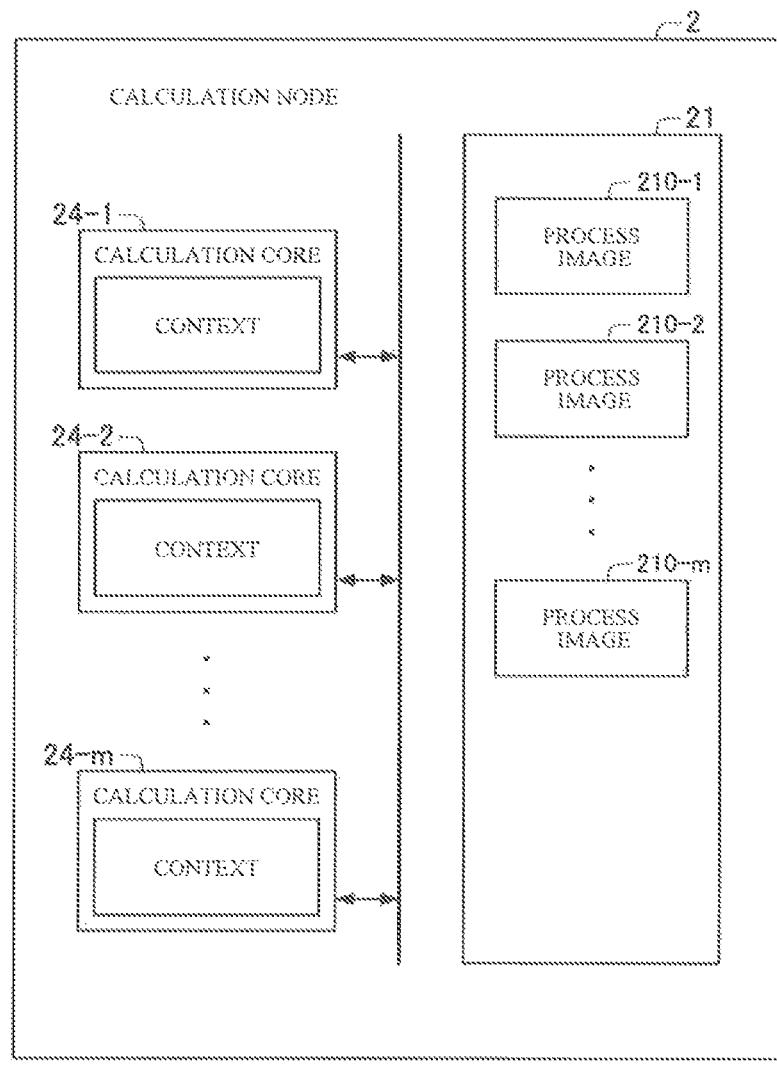

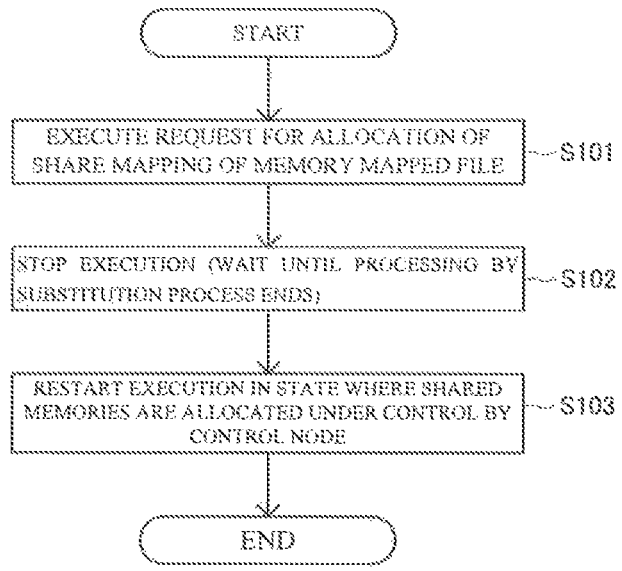
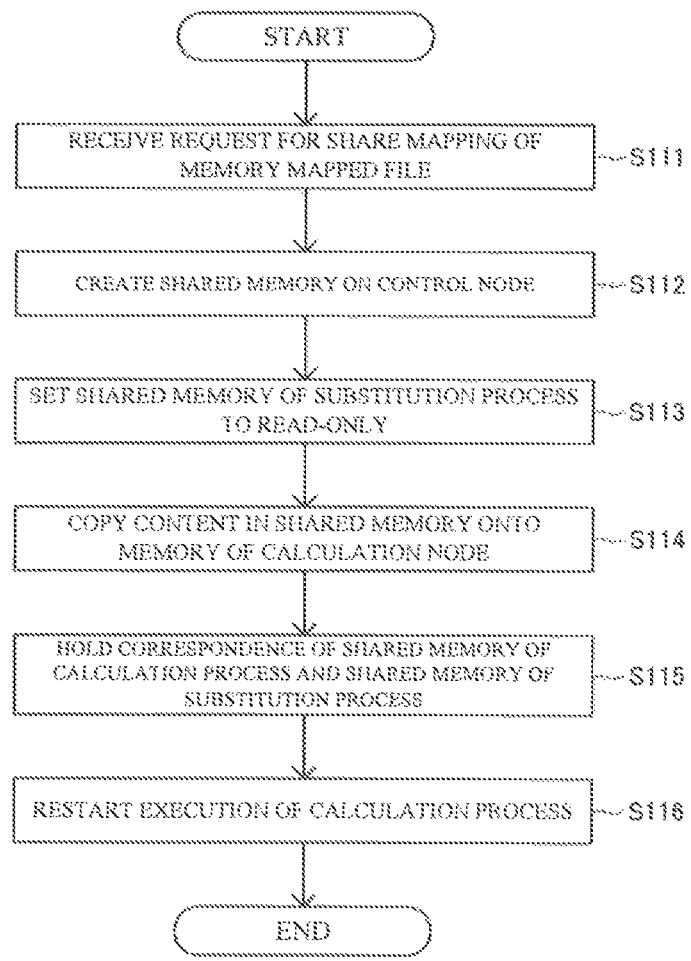

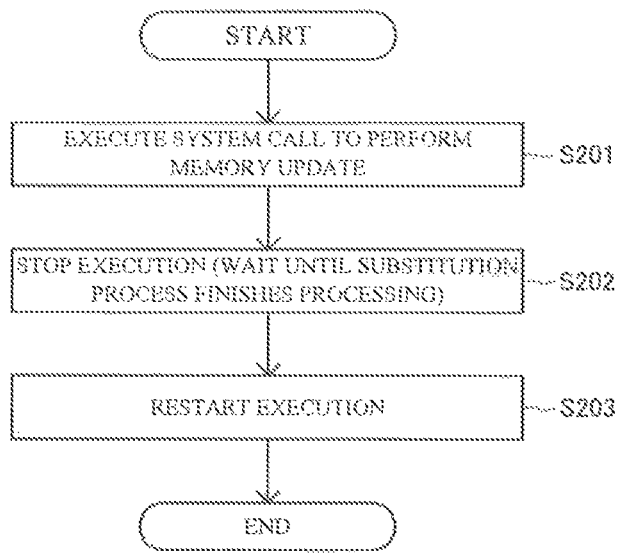
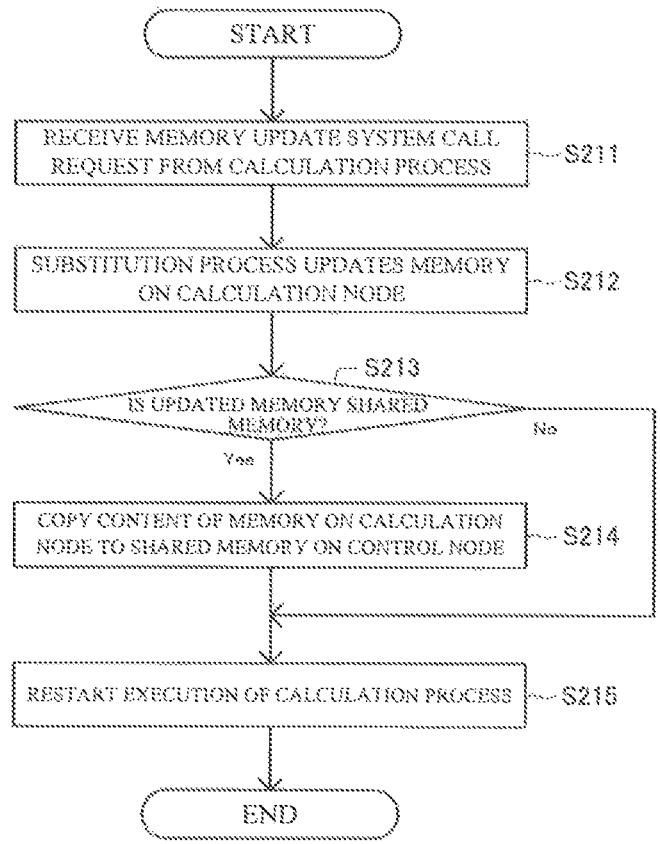

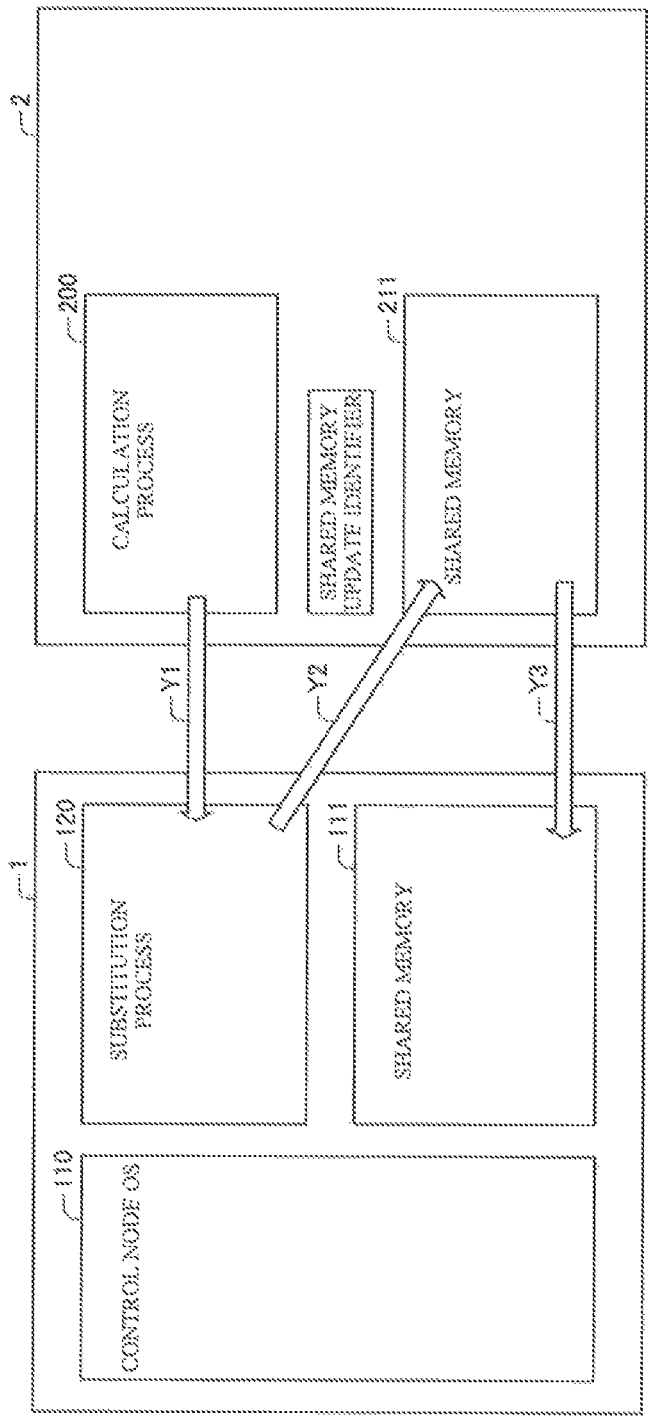

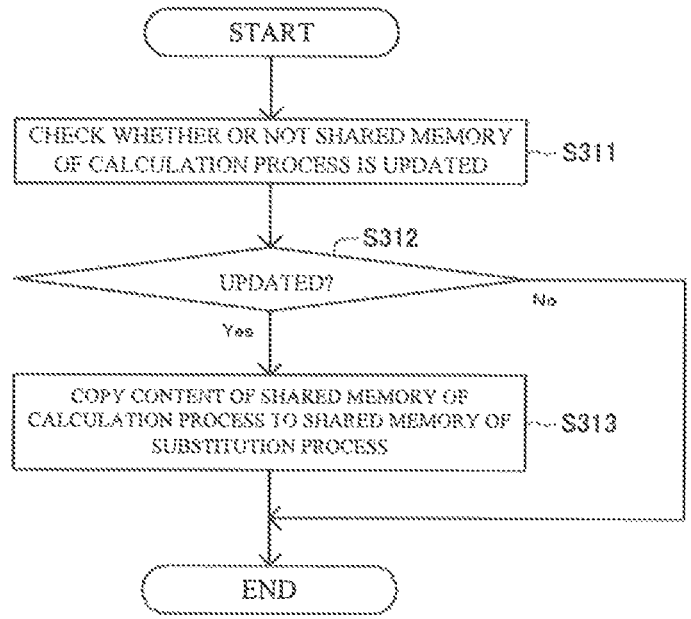

INFORMATION PROCESSING DEVICE, INFORMATION PROCESSING METHOD, MAIN PROCESSOR CORE, PROGRAM, INFORMATION PROCESSING METHOD, AND SUB PROCESSOR CORE

CROSS-REFERENCE TO RELATED PATENT APPLICATIONS

This application is a National Stage Entry of International Application No. PCT/JP2015/006491, filed Dec. 28, 2015, which claims priority from Japanese Patent Application No. 2015-030566, filed Feb. 19, 2015. The entire contents of the above-referenced applications are expressly incorporated herein by reference.

TECHNICAL FIELD

The present invention relates to an information processing device, an information processing method, a main processor core, a program, an information processing method, and a sub processor core.

BACKGROUND ART

A computer including a control node and an arithmetic node (a calculation node) is known (for example, Patent Document 1). According to a technique described in Patent Document 1, the arithmetic node executes remote processing assigned by the control node. Moreover, Input/Output issued by remote processing executed by the arithmetic node is executed via the control node.

Further, in a case where a plurality of nodes are included as described above, shared memories are used for exchanging data between the nodes (between programs). In this case, control of data synchronization between the shared memories is required. As a technique for such control of data synchronization between the shared memories, for example, Patent Documents 2 and 3 are known. Patent Document 2 describes a method for synchronizing shared memories provided for the respective memory buses of a central processing unit. Patent Document 3 describes a method used for matching data by periodically transmitting data of a shared memory provided in a transmission device.
Patent Document 1: Japanese Unexamined Patent Application Publication No. JP-A 2008-165318
Patent Document 2: Japanese Unexamined Patent Application Publication No. JP-A H3-268158 (1991)
Patent Document 3: Japanese Unexamined Patent Application Publication No. JP-A H9-269934 (1997)

In a computer including a control node and a calculation node as described above, there is a case where the calculation node does not have a precise exception function in order to indicate the performance of the calculation node. In such a case, the calculation node stops on an instruction at a moment of occurrence of an exception, and cannot recover processing from the instruction on its stoppage after exception handling. As a result, it becomes difficult to use a memory mapped file function operating with a space not present exception, and it may become difficult to perform memory sharing between different processes.

In other words, in a general memory mapped file, paging is executed in space not present exception handling, and the content of a file is actually created on a memory. Therefore, it has been a precondition to execute a memory mapped file in a CPU (Central Processing Unit) capable of precise exception. Consequently, there has been a problem that in a calculation node having a CPU which does not support precise exception, it is difficult to use the memory mapped file function and it is difficult to perform memory sharing between different processes.

As described above, there has been a problem that in a calculation node having a CPU which does not support precise exception, it is impossible to use the memory mapped file function and it is difficult to perform memory sharing between different processes.

SUMMARY

Accordingly, an object of the present invention is to provide an information processing device which solves the problem that in a calculation node having a CPU which does not support precise exception, it is impossible to use the memory mapped tile function and it is difficult to perform memory sharing between different processes.

In order to achieve the object, an information processing device as an aspect of the present invention includes a main processor core having a first memory and a sub processor core having a second memory and controlled by the main processor core. An operating system is incorporated in the main processor core. No operating system is incorporated in the sub processor core.

A shared memory area is formed in the first memory, a shared memory area is formed in the second memory, and data in the shared memory areas of the first and second memories are synchronized.

The main processor core is configured to synchronize the data in the shared memory areas formed in the first and second memories while the sub processor core stops operating.

Further, an information processing method as another aspect of the present invention is an information processing method executed by an information processing device including a main processor core having a first memory and a sub processor core having a second memory and controlled by the main processor core. An operating system is incorporated in the main processor core. No operating system is incorporated in the sub processor core. Shared memory areas are formed in the first and second memories, respectively. Data in the shared memory areas of the first and second memories are synchronized.

The information processing method includes, by the main processor core, synchronizing the data in the shared memory areas formed in the first and second memories while the sub processor core stops operating.

Further, a main processor core as another aspect of the present invention is a main processor core in which an operating system is incorporated. The main processor core has a function to control a sub processor core in which no operating system is incorporated.

A first memory is included.

A shared memory area is formed in the first memory, and data in the shared memory area is synchronized with data in a second memory included by the sub processor core.

A shared memory synchronization means is included, and the shared memory synchronization means is configured to synchronize the data in the shared memory area formed in the first memory with data in a shared memory area formed in the second memory while the sub processor core stops operating.

Further, a program as another aspect of the present invention is a program including instructions for causing a main processor core to function as a shared memory synchronization means.

The main processor core has a first memory and has a function to control a sub processor core, a shared memory area is formed in the first memory, data in the shared memory is synchronized with data in a second memory included by the sub processor core, an operating system is incorporated in the main processor core, and no operating system is incorporated in the sub processor core.

The shared memory synchronization means is configured to synchronize the data in the shared memory area formed in the first memory with data in a shared memory area formed in the second memory while the sub processor core stops operating.

Further, an information processing method as another aspect of the present invention is an information processing method executed by a main processor core in which an operating system is incorporated. The main processor core has a function to control a sub processor core in which no operating system is incorporated.

The information processing method includes synchronizing data in a shared memory area formed in a first memory included by the main processor core with data in a shared memory area formed in a second memory included by the sub processor core while the sub processor core stops operating.

Further, a sub processor core as another aspect of the present invention is a sub processor core controlled by a main processor core in which an operating system is incorporated. No operating system is incorporated in the sub processor core.

A second memory is included.

A shared memory area is formed in the second memory, and data in the shared memory area is synchronized with data in a first memory included by the main processor core The data in the shared memory area formed in the second memory is synchronized with data in a shared memory area formed in the first memory while the sub processor core stops operating.

With the configurations as described above, the present invention can provide an information processing device winch solves the problem that in a calculation node having a CPU which does not support precise exception, it is impossible to use the memory mapped file function and it is difficult to perform memory sharing between different processes.

BRIEF DESCRIPTION OF DRAWINGS

FIG. 5 is a block diagram showing an example of a configuration when the calculation node executes a calculation process in the information processing device according to the first exemplary embodiment of the present invention;

FIG. 6 is a diagram showing an example of a process correspondence table used in the information processing device according to the first exemplary embodiment of the present invention;

FIG. 7 is a flowchart showing an example of operation of the calculation node when the calculation process acquires a shared memory in the information processing device according to the first exemplary embodiment of the present invention;

FIG. 8 is a flowchart showing the example of the operation of the control node when the calculation process acquires a shared memory in the information processing device according to the first exemplary embodiment of the present invention;

FIG. 9 is a flowchart showing an example of synchronization (on the calculation node side) of the shared memories when the calculation process executes a system call in the information processing device according to the first exemplary embodiment of the present invention;

FIG. 10 is a flowchart showing an example of synchronization (on the control node side) of the shared memories when the calculation process executes a system call in the information processing device according to the first exemplary embodiment of the present invention;

FIG. 11 is a diagram showing an example of the flow of synchronization of the shared memories when the calculation process executes a system call;

FIG. 12 is a flowchart showing an example of synchronization when the calculation process performs memory update on a CPU instruction in the information processing device according to the first exemplary embodiment of the present invention;

EXEMPLARY EMBODIMENTS

[First Exemplary Embodiment]

Figure 1:
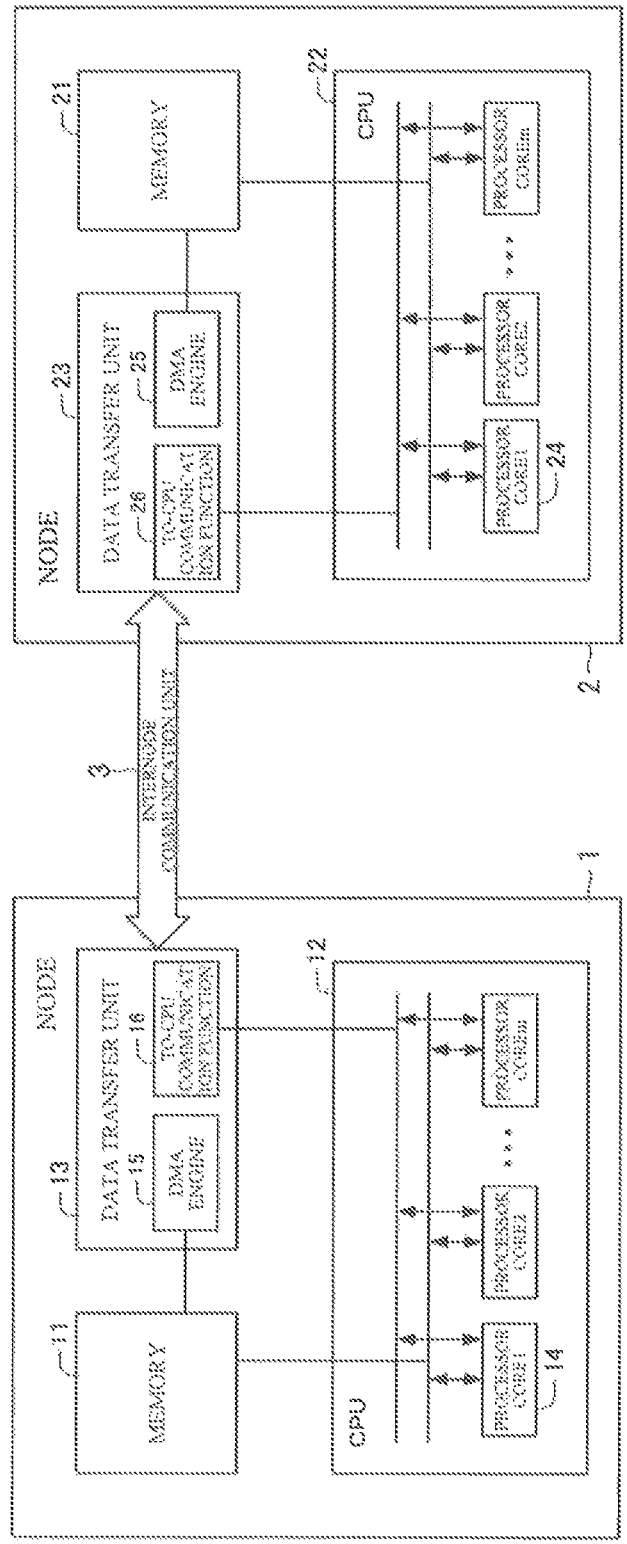
FIG. 1 is a block diagram showing an example of the configuration of an information processing device according to a first exemplary embodiment of the present invention.
Figure 2:
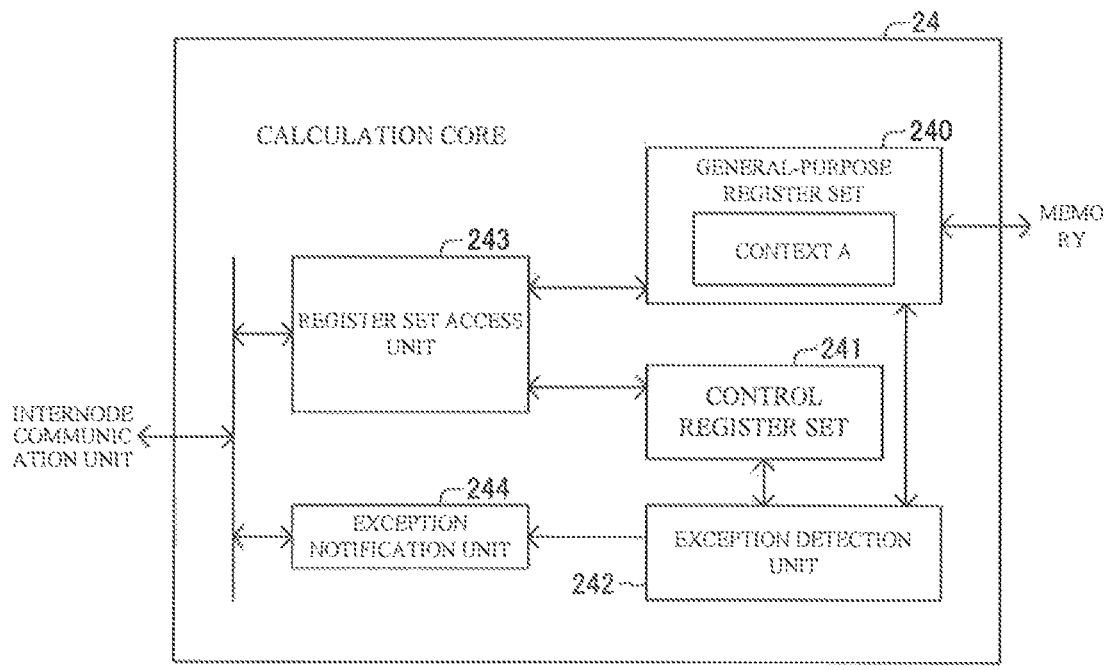
FIG. 2 is a block diagram showing an example of the configuration of a calculation core in the information processing device according to the first exemplary embodiment of the present invention.
Figure 3:
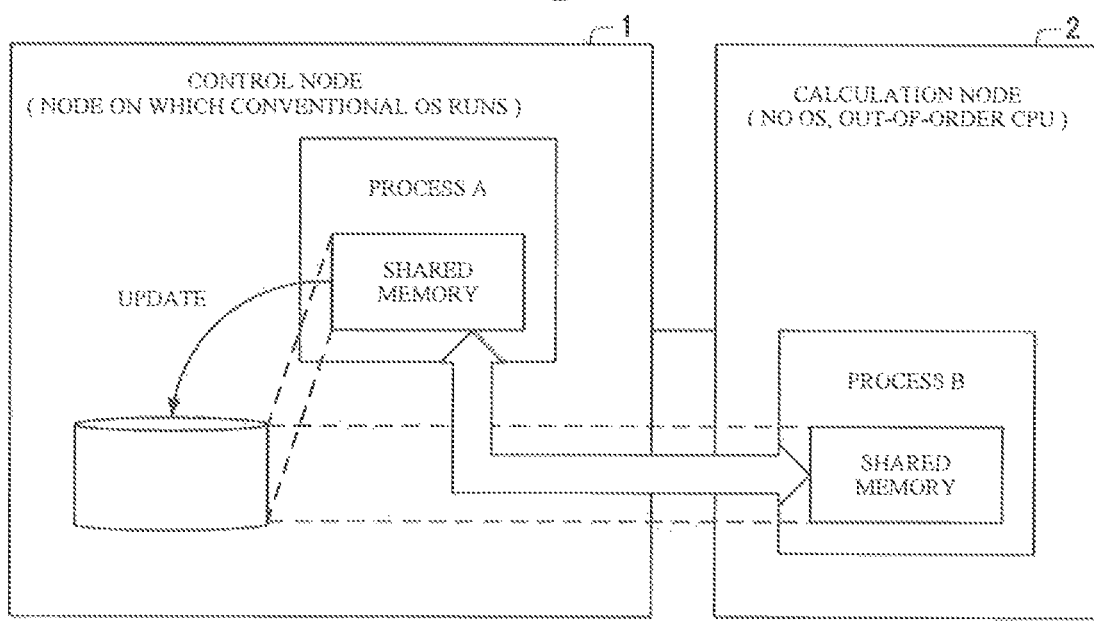
FIG. 3 is a diagram for describing processing by the information processing device according to the first exemplary embodiment of the present invention.
Figure 4:
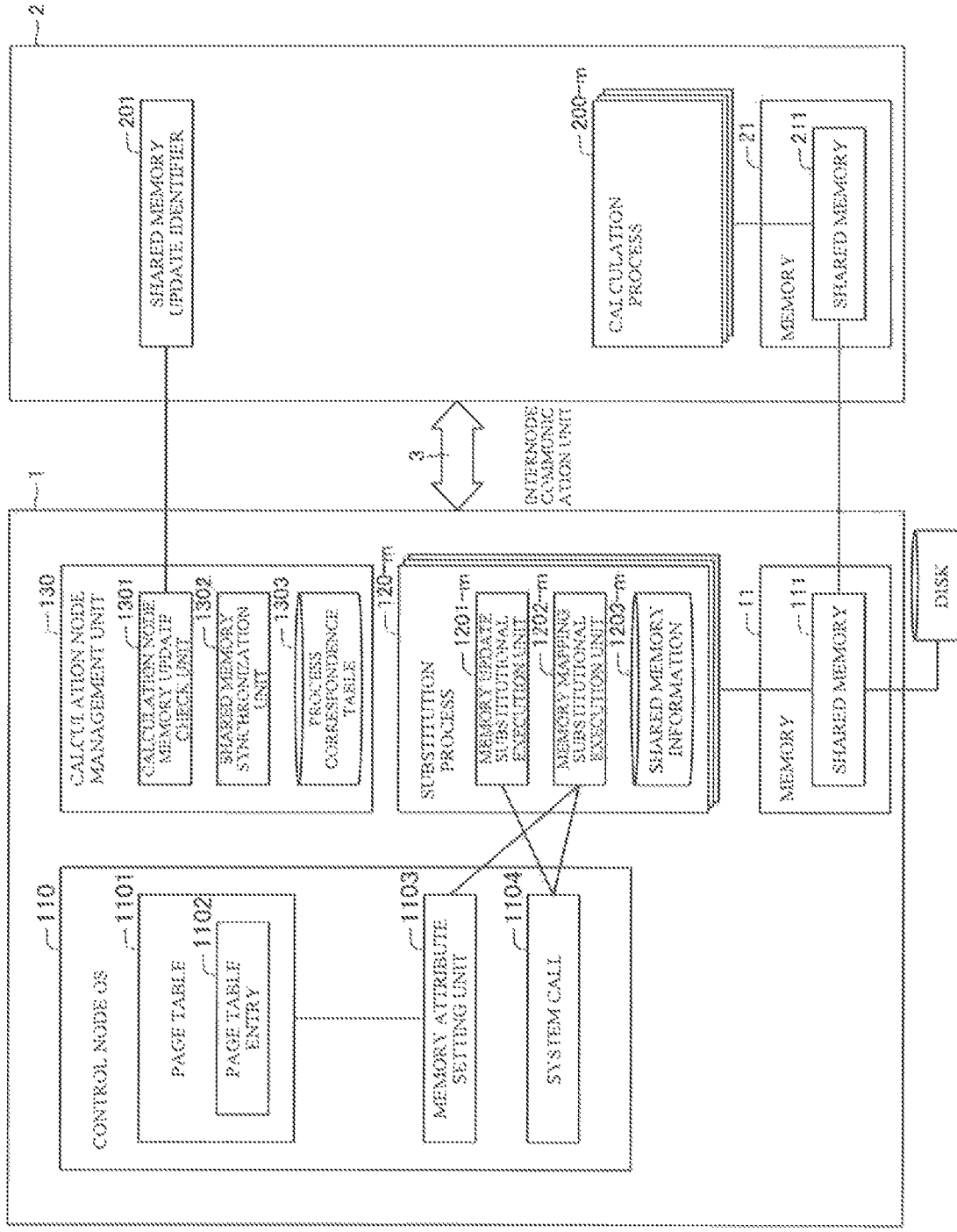
FIG. 4 is a block diagram showing an example of the configuration of a control node and a calculation node in the information processing device according to the first exemplary embodiment of the present invention.
Figure 13:
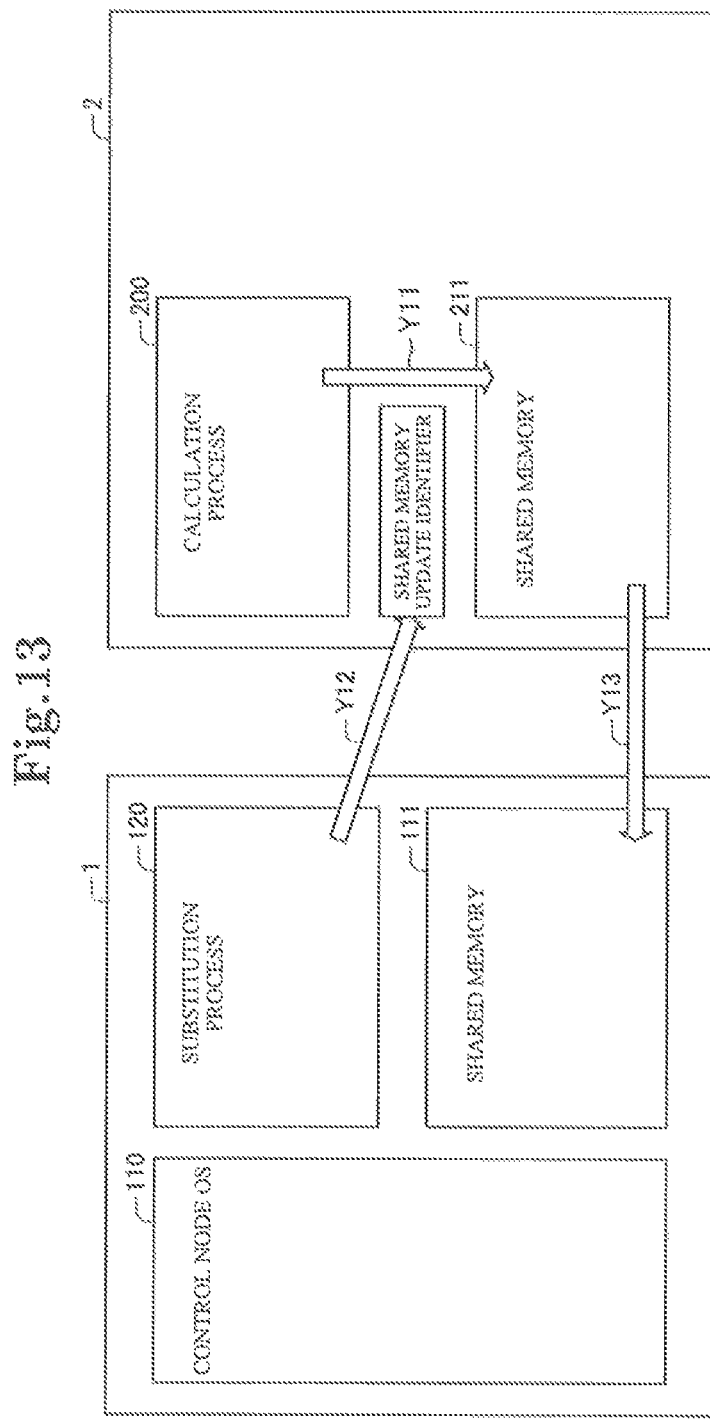
FIG. 13 is a diagram showing an example of the flow of synchronization when the calculation process performs memory update on a CPU instruction.
Figure 14:
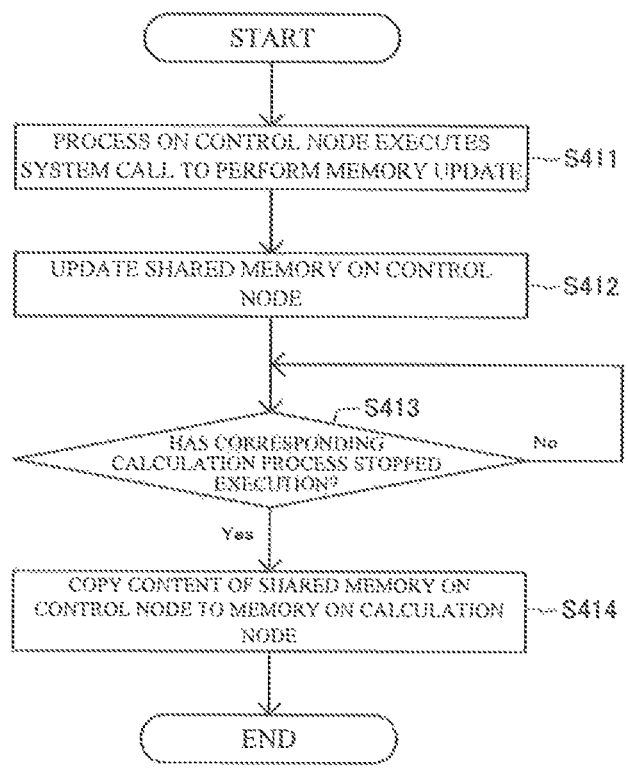
FIG. 14 is a flowchart showing an example of synchronization when a process on the control node executes a system call and updates the shared memory in the information processing device according to the first exemplary embodiment of the present invention.
Figure 15:
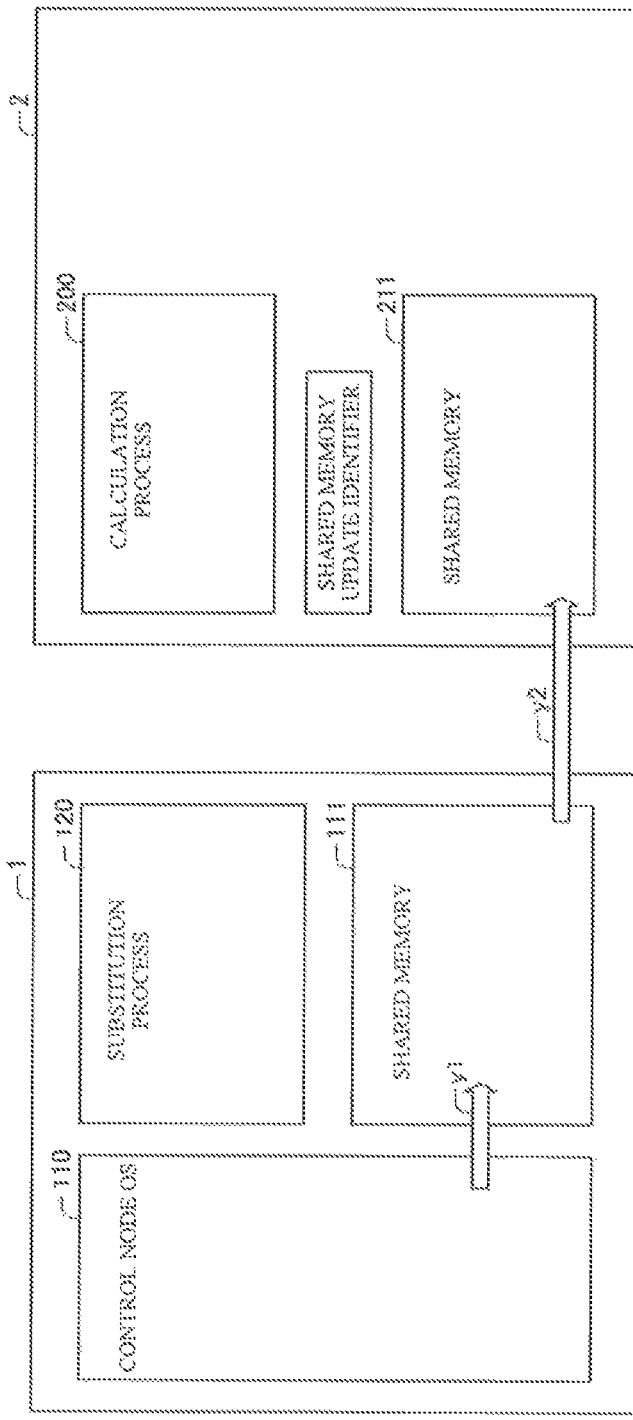
FIG. 15 is a diagram showing an example of the flow of synchronization when the process on the control node executes a system call and updates the shared memory.
Figure 16:
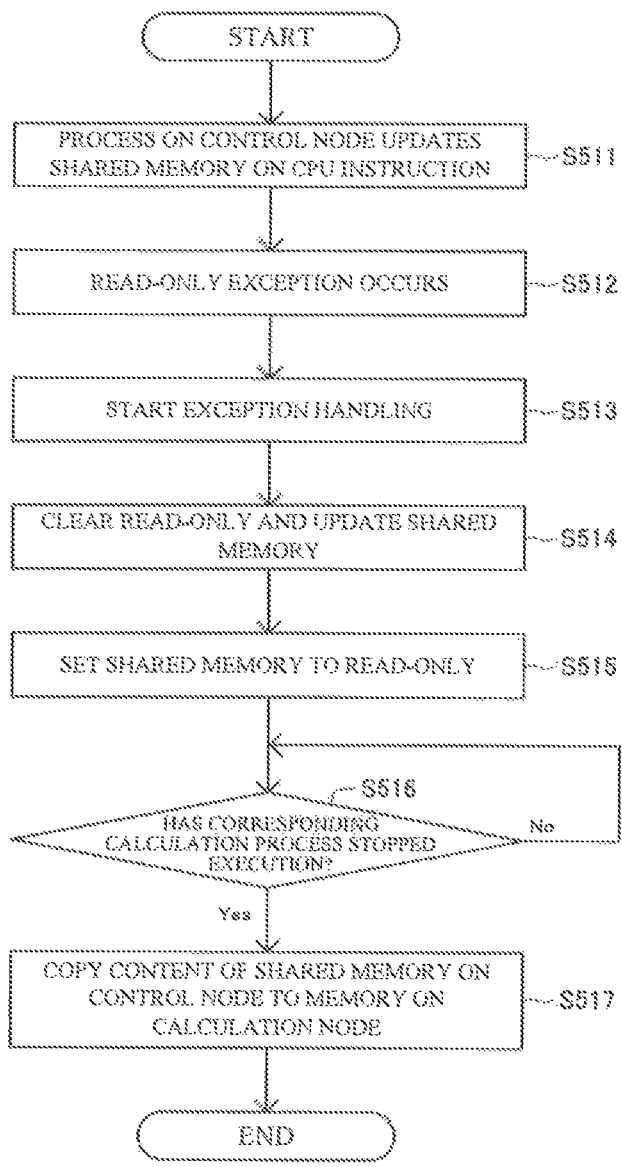
FIG. 16 is a flowchart showing an example of synchronization when the process on the control node updates the shared memory on a CPU instruction in the information processing device according to the first exemplary embodiment of the present invention.
Figure 17:
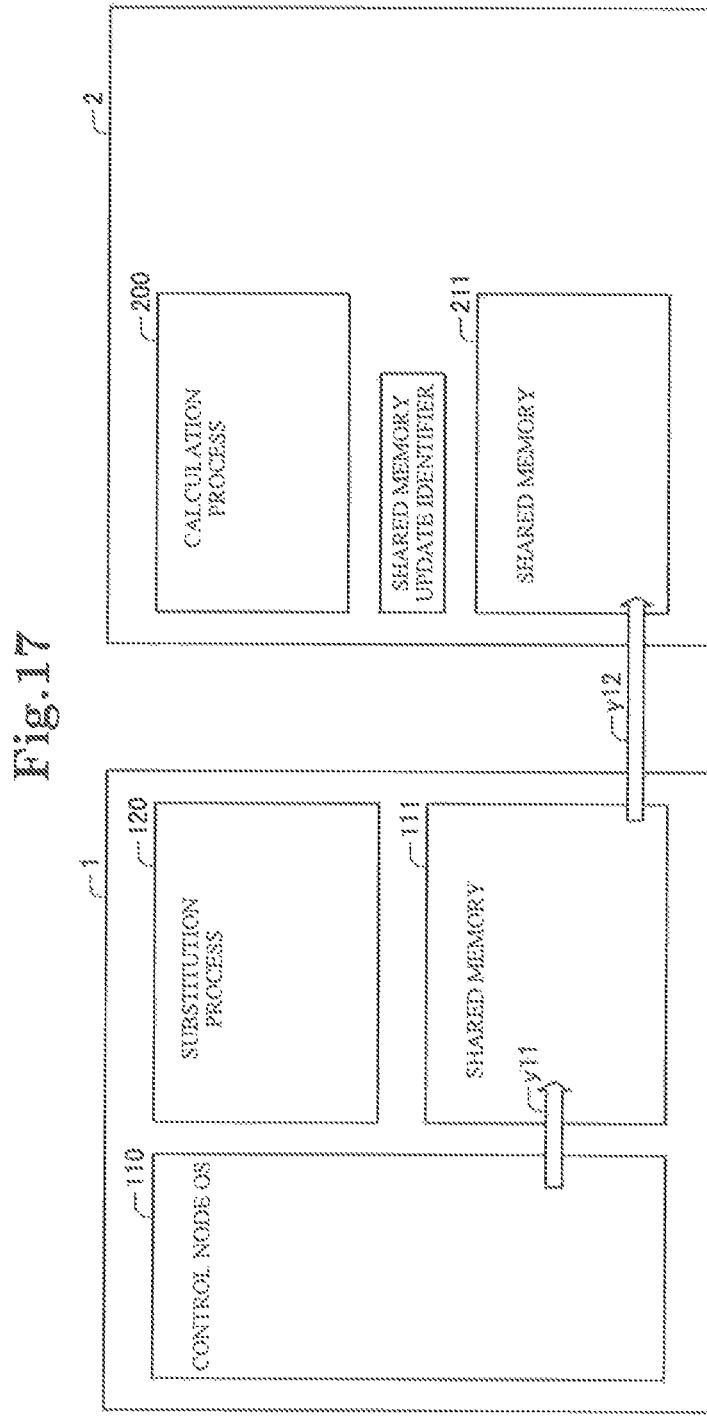
FIG. 17 is a diagram showing an example of synchronization when the process on the control node updates the shared memory on a CPU instruction.

A first exemplary embodiment of the present invention will be described with reference to FIGS. 1 to 17. FIG. 1 is a block diagram showing an example of the configuration of an information processing device. FIG. 2 is a block diagram showing an example of the configuration of a calculation core 24. FIG. 3 is a diagram for describing processing by the information processing device. FIG. 4 is a block diagram showing an example of the configuration of a control node 1 and a calculation node 2. FIG. 5 is a diagram showing an example of a configuration when the calculation node 2 executes a calculation process wp. FIG. 6 is a diagram showing an example of a process correspondence table 1303. FIGS. 7 and 8 are flowcharts showing an example of operation when the calculation process acquires a shared memory. FIGS. 9 and 10 are flowcharts showing an example of synchronization of shared memories when the calculation process executes a system call. FIG. 11 is a diagram showing an example of the flow of synchronization of the shared memories when the calculation process executes a system call. FIG. 12 is a flowchart showing an example of synchronization when the calculation process performs memory update on a CPU instruction. FIG. 13 is a diagram showing an example of the flow of synchronization when the calculation process performs memory update on a CPU instruction. FIG. 14 is a flowchart showing an example of synchronization when a process on the control node executes a system call and updates the shared memory. FIG. 15 is a diagram showing an example of the flow of synchronization when the process on the control node executes a system call and updates the shared memory. FIG. 16 is a flowchart showing an example of synchronization when the process on the control node updates the shared memory on a CPU instruction. FIG. 17 is a diagram showing an example of synchronization when the process on the control node updates the shared memory on a CPU instruction.

With reference to FIG. 1, an information processing device in this exemplary embodiment has a node 1 serving as a main processor and a node 2 serving as a sub processor. The node 1 and the node 2 are configured to be able to communication with each other via an internode communication means 3. The information processing device in this exemplary embodiment is used as, for example, a parallel computer for HPC (High Performance Computing).

In this exemplary embodiment, a case where the information processing device includes two nodes, the node 1 and the node 2, will be described. However, the configuration of the information processing device is not limited to such a case. In other words, the information processing device may include three or more nodes. Further, in this exemplary embodiment, the node 1 and the node 2 have the same computer architectures. However, the node 1 and the node 2 may employ different computer architectures.

As shown in FIG. 1, the node 1 (2) has a memory 11 (21), a CPU 12 (22), and a data transfer means 13 (23). The CPU 12 (22) has m processor cores 14 (24) (m denotes a positive integer of 1 or more). The memory 11 (21), the CPU 12 (22), and the data transfer means 13 (23) are connected by PCI Express or the like in the node, and the processor core 14 (24) can access the memory 11 (21) and the data transfer means 13 (23) through the PCI Express or the like in the node. The information processing device in this exemplary embodiment is a NUMA (Non-Uniformed Memory Access) type information processing device and, when one node accesses the memory of the other node (for example, when the node 1 accesses the memory 21 of the node 2), an internode communication means 3 is used.

The memory 11 (21) is shared by the processor cores 14 (24) in the node.

The data transfer means 13 (23) has a DMA (Direct Memory Access) engine 15 (25) that accesses the memory 11 (21) not via the CPU 12 (22), and a to-CPU communication function 16 (26) that accesses a resource such as a register on the CPU 12 (22). Meanwhile, the to-CPU communication function 16 (26) may be configured to map a resource such as a register on the CPU 12 (22) into a memory space and access the resource through the DMA engine 15 (25).

The internode communication means 3 can be realized by an interconnect which has DMA function or a RDMA (Remote Direct Memory Access) function, such as PCI Express and Infiniband.

In this exemplary embodiment the nodes of the information processing device having the NUMA type memories are discriminated in the following manner; one of the nodes is referred to as a control node, and the other is referred to as a calculation node. In this exemplary embodiment, the control node has an operating system (OS) function, whereas the calculation node does not have an operating system function. Moreover, the calculation node has the CPU 22 that does not support precise exception. The CPU 22 may be configured to conduct out-of-order execution, or may be configured to conduct in-order execution. In FIG. 1, the node 1 is the control node, and the node 2 is the calculation node. In other words, the control node 1 includes the memory 11, the CPU 12, and the data transfer means 13. Moreover, the calculation node 2 includes the memory 21, the CPU 22, and the data transfer means 23. Hereinafter, the processor core 24 on the calculation node 2 is referred to as a calculation core.

With reference to FIG. 2, the calculation core 24 includes a general-purpose register set 240, a control register set 241, an exception detection means 242, a register set access means 243, and an exception notification means 244.

The general-purpose register set 240 includes a program counter (PC), a general-purpose register (GPR) for storing a calculation result, and so on, likewise a general processor such as x86 and ARM. These registers are rewritten with execution of an instruction in the calculation core 24. Moreover, when the calculation core 24 executes a load instruction or a store instruction, data is transferred between the general-purpose register set 240 and the memory.

The control register set 241 is a register for controlling execution of the calculation core 24. The control node 1 instructs the control register 241 of the calculation node 2 to start and stop execution of an instruction through the internode communication means 3 and the data transfer means 13 and 23. When the control node 1 instructs the calculation core 24 to start execution, the calculation core 24 starts processing in accordance with the content of the general-purpose register 240. To be specific, the calculation core 24 fetches an instruction in accordance with the value of a program counter, executes the fetched instruction, and updates the content of the general-purpose register set 240 and the memory 21. This state is referred to as an instruction executed state. On the other hand, when the control node 1 instructs the calculation core 24 to stop execution, the calculation core 24 stops execution of a new instruction. A state in which an instruction to stop execution is given and no instruction is in progress on the calculation core 24 is referred to as an instruction execution stopped state. Once proceeding to the instruction execution stopped state, the calculation core 24 does not execute a new instruction until instructed to start execution by the control node 1. Whether the calculation core 24 is in the instruction executed state or in the instruction execution stopped state can be referred to by the control node 1 through the internode communication means 3, the data transfer means 13, and the register set access means 243. If a function to refer to is not provided, it is possible to configure to send out exception information and thereby notify the control node whether the calculation core is in the instruction executed state or the instruction execution stopped state.

The exception detection means 242, when detecting an exception during execution of an instruction, instructs the control register set 241 to stop the execution. At the same time, the exception detection means 242 asks the exception notification means 244 for exception notification (transmits exception occurrence information). The abovementioned exception is an exception which occurs in a general processor, such as an arithmetic exception including the division by zero exception, a memory access exception including a memory access boundary error, and a software trap for calling a system call.

The exception notification means 244 notifies stoppage of execution by the calculation core 24 to the control node 1 via the internode communication means 3, on the basis of exception occurrence information acquired from the exception detection means 242. The exception notification means 244 may be implemented by any method as far as it can notify occurrence of an exception to the control node 1. Therefore, the exception notification means 244 can be realized by the following methods; (A) an interrupt function of the internode communication means 3, such as MSI/MSI-X of PCI Express, and (B) DMA writing into a previously reserved memory area. In a case where the method (B) is employed, a calculation node management means 120 to be described later on the control node 1 needs to monitor the presence or absence of exception notification from the calculation node 2 by a method such as polling. Meanwhile, the exception notification means 244 may inhibit exception occurrence notification to the control node 1 in accordance with setting by the control node 1. In this case, (C) it is possible to configure the control node 1 to directly monitor (poll) the execution status of the control register set 241 and thereby detect occurrence of an exception.

The register set access means 243 conducts reading from and writing to each register of the general-purpose register set 240 and the control register set 241 on the basis of an instruction issued by the control node 1. Issue of reading from and writing to the general-purpose register set 240 is allowed only on the calculation core 24 in the instruction execution stopped state. The operation of the calculation core 24 when there is an access to the general-purpose register set 240 of the calculation core 24 in the instruction executed state is unstable (for example, the access is ignored).

The information processing device in this exemplary embodiment has a configuration as described above as an example. In other words, the information processing device in this exemplary embodiment includes one control node 1 and one or more calculation nodes 2. An operating system is incorporated in the control node 1. The control node 1 develops a plurality of processes on the calculation node 2 and executes simultaneously. On the other hand, the operating system does not run on the calculation node 2. Moreover, the calculation core 24 in this exemplary embodiment does not support precise exception.

As shown in FIG. 3, the information processing device in this exemplary embodiment synchronizes the content of data in the memory 11 (the first memory) on the control node 1 with the content of data in the memory 21 (the second memory) on the calculation node 2 so as to be the latest content, thereby allowing substantial memory sharing between the control node 1 and the calculation node 2. To be specific, as described later, the information processing device in this exemplary embodiment creates shared memories by share mapping of a memory mapped file on the control node 1 and the calculation node 2, and updates the shared memories created on the control node 1 and the calculation node 2 at a proper timing, thereby allowing substantial memory sharing.

FIG. 4 shows an example of a configuration for allowing substantial memory sharing as described above in the information processing device in this exemplary embodiment. Below, the calculation node 2 and the control node 1 will be described in more detail.

<Calculation Node>

As described above, the operating system does not run on the calculation node 2. Therefore, an adverse effect of the OS such as OS jitter can be eliminated. Moreover, the calculation core 24 of the calculation node 2 does not support precise exception. This configuration is considered, for example, when it is required to get higher performance out of the calculation node 2.

In order to employ a calculation model realized by a general computer on the calculation node 2, the control node 1 provides a substitute function tor a service provided by a general operating system to the calculation node 2 via the internode communication means 3.

As shown in FIG. 4, a plurality of calculation processes 200-$m$ are developed on the calculation node 2. Herein, the calculation processes 200-$m$ are processes developed on the calculation node 2. The calculation process 200-$m$ is generated, for example, with start of an application program running on the calculation node 2, and is discarded, for example, with end of execution thereof.

To be specific, as shown in FIG. 5, a plurality of process images 210-$m$, which are data relating to the calculation processes 200-$m$, are stored in the memory 21 of the calculation node 2. Moreover, a context of one calculation process 200-$m$ is stored in each calculation core 24-$m$. Each calculation core 24-$m$ performs processing of the calculation process 200-$m$ by using the process image 210-$m$ on the memory 21 corresponding to the stored context. Herein, the number of the process images 210-$m$ stored in the memory 21 may be different from the number of the calculation cores 24-$m$.

Further, a shared memory 211 is created in the memory 21 of the calculation node 2 through a process to be described later (see FIG. 4). In the shared memory 211, a shared memory acquired by the calculation process 200-$m$ is arranged. As described later, the information processing device in this exemplary embodiment synchronizes the content of data of the shared memory 211 with the content of data of a shared memory 111 of the control node 1.

Further, the calculation node 2 has a shared memory update identifier 201 which, when the calculation process 200-$m$ updates data in the shared memory 211, shows data in the shared memory 211 is changed. The shared memory update identifier 201 is manipulated by the calculation process 200-$m$ so as to, when the calculation process 200-$m$ updates the shared memory 211, show data in the shared memory 211 is updated.

<Control Node>

The control node 1 has the same configuration as a general standalone computer system using an operating system, and provides a service of an operation system function for the calculation node 2. In this specification, an operating system incorporated in the control node 1 will be referred to as a control node OS 110. The control node OS 110 has a general function as an operating system, such as a memory mapped file function, for example. The control node OS 110 may be a commodity operating system used for a computer, like Linux™ and Windows™.

Unlike the calculation node 2, the control node 1 can virtualize hardware (the processor core 14 and the memory 11) by using a system management function of the control node OS 110 because the control node OS 110 runs. Moreover, the shared memory 111 is created in the memory 11 of the control node 1 through a process to be described later, in the same manner as in the calculation node 2.

The control node 1 has a plurality of substitution processes 120-$m$ and a calculation node management means 130 on the control node OS 110. Moreover, the control node OS 110 has, for example, functions of a page table 1101, a memory attribute setting means 1103 and a system call 1104.

The page table 1101 holds information relating to the memory in the case of employing paging, in the page table 1101, mapping of a virtual address and a physical address is stored. Moreover, the page table 1101 has a page table entry 1102 corresponding to one page of the memory. A use status of a page and an attribute set to a page are held in the page table entry 1102.

The memory attribute setting means 1103 sets the attribute of the memory at the time of acquisition of the shared memory 111 to be described later. For example, the memory attribute setting means 1103 sets the attribute of the memory to read-only at the time of acquisition of the shared memory 111.

The system call 1104 provides the control node 1 and the calculation node 2 with the OS function. For example, the calculation node 2 uses the system call 1104 via the substitution process 120-$m$.

The substitution processes 120-$m$ are generated so as to correspond to the respective calculation processes 200-$m$ on the calculation node 2. Therefore, one of the substitution processes 120-$m$ corresponds to one of the process images 210-$m$ on the calculation node 2, The substitution process 120-$m$ is associated with the calculation process 200-$m$ on the calculation node 2, and accepts a system call request issued by the calculation process 200-$m$ via the internode communication means 3 and the calculation node management means 130. The substitution process 120-$m$ performs system call processing in pace of the operating system to be present on the calculation node 2 by using the system call 1104.

The substitution process 120-$m$ has a plurality of functions to substitutionally execute a system call request. For example, the substitution process 120-$m$ has functions as a memory update substitutional execution means 1201-$m$ and a memory mapping substitutional execution means 1202-$m$. The memory update substitutional execution means 1201-$m$ substitutionally executes a system call which performs memory update of the calculation process 200-$m$. The memory mapping substitutional execution means 1202-$m$ is used for execution of the memory mapped file function according to the present invention by the calculation process 200-$m$.

Further, the substitution process 120-$m$ has shared memory information 1203-$m$ which holds a correspondence status of the shared memory 111 used by the substitution process 120-$m$ and the shared memory 211 used by the calculation process 200-$m$. For example, in the shared memory information 1203-$m$, area information of the shared memory 111 used by the substitution process 120-$m$ and area information of the shared memory 211 used by the corresponding calculation process 200-$m$ are stored so as to be associated with each other.

The calculation node management means 130 is generated for the calculation node 2 and manages hardware resources such as the processor core 24 (the calculation core 24) and the memory 21 on the calculation node 2. Therefore, in a case where the information processing device has a plurality of calculation nodes 2, the calculation node management means 130 is generated for each of the calculation nodes 2. Moreover, the calculation node management means 130 serves as an intermediary to access the calculation core 24 by the substitution process 120-$m$ for some resource. For example, the calculation node management means 130 allocates the calculation core 24 at the time of generation of the calculation process 200-$m$, manages the memory on the calculation node 2, and serves as an intermediary for a system call from the calculation process 200-$m$ to the substitution process 120-$m$.

In order to realize the abovementioned operation, the calculation node management means 130 links the hardware resources such as the calculation cores 24 and the memory 21 on the calculation node 2 to virtualized resources such as the calculation processes 200-$m$ and the substitution processes 120-$m$, and manages them. For example, the calculation node management means 130 stores correspondence of the substitution processes 120-$m$ and the calculation cores 24 in the process correspondence table 1303.

FIG. 6 shows an example of the process correspondence table 1303. With reference to FIG. 6, a substitution process ID 13031 and a calculation core number 13032 are linked to each other in the process correspondence table 1303. The substitution process ID 13031 is an ID for identifying the substitution process 120-$m$. The calculation core number 13032 represents the number of the calculation core 24 on which the calculation process 200-$m$ corresponding to the substitution process 120-$m$ is running. For example, on the first row in FIG. 6, the number of the calculation core 24 on which the calculation process 200-$m$ corresponding to the substitution process 120-$m$ "31996" is running is "Core #0."

Use of such a process correspondence table 1303 enables the calculation node management means 130 to obtain the corresponding substitution process ID 13031 from the calculation core number 13032. Moreover, the calculation node management means 130 can obtain the calculation core number 13032, which is the number of the operating calculation core 24, from the substitution process ID 13031.

Further, the calculation node management means 130 has, for example, functions as a calculation node memory update check means 1301 and a shared memory synchronization means 1302. The calculation node memory update check means 1301 checks the update status of the data in the shared memory 211 on the calculation node 2. For example, the calculation node memory update check means 1301 refers to the shared memory update identifier 201 on the calculation node 2, thereby checking whether the content of the data in the shared memory 211 is updated. The shared memory synchronization means 1302 synchronizes the shared memory 111 on the control node 1 with the shared memory 211 on the calculation node 2. For example, the shared memory synchronization means 1302 copies an updated content of the data in the shared memory 211 on the calculation node 2 to the shared memory 111 on the control node 1. Alternatively, for example, the shared memory synchronization means 1302 copies an update content of the data in the shared memory 111 on the control node 1 to the shared memory 211 on the calculation node 2.

The above is a detailed description of the calculation node 2 and the control node 1 included by the information processing device in this exemplary embodiment. The calculation node 2 and the control node 1 acquire the shared memories 111 and 211 by using the configuration described above. Moreover, the calculation node 2 and the control node 1 synchronizes the shared memories 111 and 211 at a predetermined timing to be described later. Below, the operation of the information processing device in this exemplary embodiment when acquiring the shared memories 111 and 211 and the operation when synchronizing the shared memories 111 and 211.

First, an example of the operation when the calculation process 200-*m* on the calculation node 2 acquires the shared memories 111 and 211 by shared mapping of a memory mapped file will be described by using FIGS. 7 and 9.

[When Acquiring Shared Memory]

FIG. 7 is a flowchart showing processing by the calculation node 2. With reference to FIG. 7, the calculation process 200-*m* running on the calculation node 2 requests the substitution process 120-*m* of the control node 1 to allocate the shared memories 111 and 211 (execute a system call) (step S101). With requesting allocation, the calculation process 200-*m* stops execution of itself (step S102). Consequently, the calculation process 200-*m* waits until the substitution process 120-*m* substitutionally executes the system call and restarts execution of the calculation process 200-*m* (the calculation process 200-*m* stops until it is restarted by the substitution process 120-*m*). After allocation of the shared memories 111 and 211 is completed by the substitution process 120-*m*, execution of the calculation process 200-*m* is restarted by the substitution process 120-*m* (step S103).

FIG. 8 is a flowchart showing processing by the control node 1. With reference to FIG. 8, the calculation node management means 130 acquires a system call of shared memory allocation issued by the calculation node 2 (the calculation process 200-*m*) (step S111). Then, the calculation node management means 130 notifies the acquired system call to the substitution process 120-*m*. Thus, the system call of shared memory allocation is started by the substitution process 120-*m*.

With the memory mapped file function provided by the control node OS 110, the substitution process 120-*m* causes the memory mapping substitutional execution means 1202-*m* to retrieve a file to be shared from an external disk or the like and create the shared memory 111 on the memory 11 of the control node 1 (step S112). Further, the memory mapping substitutional execution means 1202-*m* of the substitution process 120-*m* causes the memory attribute setting means 1103 to set the attribute of the created shared memory 111 to read-only (step S113).

Subsequently, the memory mapping substitutional execution means 1202-*m* of the substitution process 120-*m* creates an area of the shared memory 211 on the memory 21 of the calculation node 2. Then, the memory mapping substitutional execution means 1202-*m* copies the content in the shared memory 111 on the control node 1 to the shared memory 211 on the calculation node 2 (step S114).

Then, the substitution process 120-*m* holds area information of the created shared memory 111 on the control node 1 and the corresponding shared memory 211 on the control node 2 into the shared memory information 1203-*m* (step S115). Alter that, the substitution process 120-*m* restarts execution of the calculation process 200-*m* (step S116).

The above is an example of the operation when acquiring the shared memories 111 and 211. Next, the operation when synchronizing the shared memory 111 created on the control node 1 with the shared memory 211 created on the calculation node 2 will be described.

The information processing device in this exemplary embodiment synchronizes the shared memory 111 with the shared memory 211 while the calculation process 200-*m* stops execution. To be specific, the information processing device synchronizes the shared memory 111 with the shared memory 211 at four timings shown below;

(1) when the calculation process 200-*m* of the calculation node 2 issues a system call of memory update (update of the shared memory 211), (2) when the calculation process 200-*m* transits to the instruction execution stopped state (in a case where the calculation process 200-*m* updates the shared memory 211 on a CPU instruction).

(3) when the control node 1 updates the shared memory 111 in accordance with a system call and thereafter the corresponding calculation process 200-*m* transits to the instruction execution stopped state, and (4) when the control node 1 updates the shared memory 111 in accordance with a CPU memory and thereafter the corresponding calculation process 200-*m* transits to the instruction execution stopped state.

[Timing (1)]

First, an example of synchronization processing executed when the calculation process 200-*m* of the calculation node 2 issues a system call to perform memory update will be described by using FIGS. 9 and 10. FIG. 9 is a flowchart showing processing executed by the calculation node 2. Referring to FIG. 9, the calculation process 200-*m* running on the calculation node 2 issues a system call to perform memory update to the substitution process 120-*m* of the control node 1 (step S201). With issuing the system call, the calculation process 200-*m* stops execution thereof (step S202). Thus, the calculation process 200-*m* waits until the substitution process 120-*m* substitutionally executes the system call and restarts execution of the calculation process 200-*m* (the calculation process 200-*m* stops until it is restarted by the substitution process 120-*m*). After execution of the system call and synchronization of the memories are done by the substitution process 120-*m*, execution of the calculation process 200-*m* is restarted by the substitution process 120-*m* (step S203).

FIG. 10 is a flowchart showing processing executed by the control node 1. With reference to FIG. 10, the calculation node management means 130 acquires a system call to perform memory update issued by the calculation node 2 (the calculation process 200-*m*) (step S211). Then, the calculation node management means 130 notifies the acquired system call to the substitution process 120-*m*. Thus, the system call to perform memory update is started by the substitution process 120-*m*.

The substitution process 120-*m* uses the memory update substitutional execution means 1201-*m* to update the content of the memory 211 on the calculation node 1 on the basis of the system call request (step S212). Subsequently, the memory update substitutional execution means 1201-*m* of the substitution process 120-*m* refers to the shared memory information 1203-*m* and checks whether or not the above update of the data is update of the data in the shared memory 211 (step S213).

In a case where the update of the data based on the above system call is update of the data in the shared memory 211 (step S213, Yes), the substitution process 120-*m* uses the shared memory synchronization means 1302 to copy the updated content of the shared memory 211 to the shared memory 111 of the control node 1 (step S214). After that, the substitution process 120-*m* restarts execution of the calculation process 200-*m* (step S215).

On the other hand, in a case where the update of the data based on the system call is not update of the data in the shared memory 211 (step S213, No), the substitution process 120-*m* does not synchronize the shared memory 111 with the shared memory 211 and restarts execution of the calculation process 200-*m* (step S215).

The information processing device in this exemplary embodiment synchronizes the shared memory 111 with the shared memory 211 through processing as described above as an example. In other words, with reference to FIG. 11, the calculation process 200 of the calculation node 2 requests the substitution process 120 of the control node 1 to substitutionally execute a system call to update the shared memory 211 (Y1). With the request, the calculation process 200 stops. Subsequently, the substitution process 120 having received the request updates the content of the shared memory 211 on the calculation node 2 in accordance with the system call request (Y2). Then, the substitution process 120 copies the update content of the data in the shared memory 211 to the shared memory 111 (Y3). After that, the substitution process 120 restarts the calculation process 200 having stopped.

[Timing (2)]

Next, an example of synchronization processing executed when the calculation process 200-*m* transits to the instruction execution stopped state will be described by using FIG. 12.

As described before, on the calculation node 2, the operating system does not run, so that regular processing such as timer interrupt is not performed. Therefore, for the purpose of process scheduling or the like, the control node 1 regularly causes the calculation process 200-*m* to transit from to the instruction executed state to the instruction execution stopped state. Thus, the control node 1 copies the content of the shared memory 211 updated by the calculation process 200-*m* to the shared memory 111 at the timing that the calculation process 200-*m* transits to the instruction execution stopped state. Thus, the shared memory 111 and the shared memory 211 are synchronized. Further, the calculation process 200-*m* may update data in the shared memory 211 in accordance with a CPU instruction while executing the processing. In this case, the calculation process 200-*m* in this exemplary embodiment uses the shared memory update identifier 201 to show the data in the shared memory 211 has been updated.

With reference to FIG. 12, the substitution process 120-*m* uses the calculation node memory update check means 1301 to check the shared memory update identifier 201 at the timing that the calculation process 200-*m* stops execution by a process switch or the like (step S311).

In a case where the data in the shared memory 211 is updated (step S312, Yes), the substitution process 120-*m* uses the shared memory synchronization means 1302 to copy the update content of the shared memory 211 to the shared memory 111 of the control node 1 (step S313). On the other hand, in a case where the data in the shared memory 211 is not updated (step S312, No), the substitution process 120-*m* does not synchronize the shared memory 111 with the shared memory 211. After that, other processing such as process switch is continued.

Through processing as described above as an example, the information processing device synchronizes the shared memory 111 with the shared memory 211 when the calculation process 200-*m* transits to the instruction execution stopped state. In other words, with reference to FIG. 13, the calculation process 200 updates the data in the shared memory 211 on a CPU instruction (Y11). After that, the calculation process 200 stops execution by process switch or the like. Then, at the timing that the calculation process 200 stops, the substitution process 120 uses the calculation node memory update check means 1301 to check the shared memory update identifier 201 (Y12). In a case where the data in the shared memory 211 has been updated, the substitution process 120 uses the shared memory synchronization means 1302 to copy the update content of the data in the shared memory 211 to the shared memory 111 (Y13). After that, other processing such as process switch is continued.

As described before, it can be referred to by the control node 1 whether the calculation core 24 is in the instruction executed state or in the instruction execution stopped state. Therefore, the substitution process 120-*m* can determine whether the calculation process 200-*m* is in the execution state or in the execution stopped state.

[Timing (3)]

Next, an example of synchronization of the shared memory 111 with the shared memory 211 when the process on the control node 1 updates the shared memory by a system call will be described by using FIG. 14.

With reference to FIG. 14, the process on the control node 1 uses the system call 1104 to execute a system call to update the shared memory 111 (step S411). Thus, the content of the shared memory 111 is updated (step S412).

After that, the control node 1 refers to the shared memory information 1203-*m* to specify an area of the shared memory 211 corresponding to the updated area of the shared memory 111. Then, the control node 1 checks the instruction execution status of the calculation process 200-*m* using the area of the shared memory 211 described above (step S413). Subsequently, at the timing that the calculation process 200-*m* stops execution (step S413, Yes), the control node 1 causes the shared memory synchronization means 1302 to copy the update content of the shared memory 111 to the shared memory 211 (step S414). Thus, the shared memory 111 and the shared memory 211 are synchronized with each other. At this time, exclusive control is properly executed in order to prevent the shared memory 211 on the calculation node 2 from being updated at the unintended timing.

Through processing as described above as an example, the information processing device performs synchronization of the shared memory 111 with the shared memory 211 in a case where the process on the control node 1 has updated the shared memory 111 on a system call. In other words, with reference to FIG. 15, the process on the control node 1 uses the system call 1104 to execute a system call to update the shared memory 111 (y1). After that, the control node 1 refers to the shared memory information 1203-*m* to specify an area of the shared memory 111 corresponding to the updated area of the shared memory 211. Then, the control node 1 checks the instruction execution status of the calculation process 200-*m* using the area of the shared memory 211 described above. After that, at the timing that the calculation process 200-*m* using the specified area of the shared memory 211 stops execution, the control node 1 uses the shared memory synchronization means 1302 to copy the update content of the data in the shared memory 111 to the shared memory 211 (y2).

[Timing (4)]

Next, an example of synchronization of the shared memory 111 with the shared memory 211 when the process on the control node 1 updates the shared memory 111 on a CPU instruction will be described by using FIG. 16.

With reference to FIG. 16, the process on the control node 1 intends to update the shared memory 111 on a CPU instruction (step S511). Because the attribute of read-only has been given to a target area by the memory attribute setting means 1103 as described above, read-only exception occurs (step S512). Thus, the control node 1 performs the above exception handling (step S513) and, during the exception handling, temporarily clears read-only and updates the shared memory 111 (step S514). After updating the shared memory 111, the control node 1 uses the memory attribute setting means 1103 to set the attribute of the shared memory 111 to read-only again (step S515).

After that, the control node 1 by refers to the shared memory information 1203-m to check the instruction execution status of the calculation process 200-m using the shared memory 211 corresponding to the updated shared memory 111 (step S516). At the timing that the calculation process 200-m stops execution (step S516, Yes), the control node 1 causes the shared memory synchronization means 1302 to copy the content of the updated shared memory 111 to the shared memory 211 (step S517). Thus, the shared memory 111 and the shared memory 211 are synchronized with each other. At this time, in order to prevent the shared memory 211 on the calculation node 2 from being updated at the unintended timing, mutual exclusion is properly performed.

Through processing as described above as an example, the information processing device performs synchronization of the shared memory 111 with the shared memory 211 in a case where the process on the control node 1 has updated the shared memory 111 on a CPU instruction. In other words, with reference to FIG. 17, while handling an exception caused when intending to update the shared memory 111 on a CPU instruction, the process on the control node 1 temporarily clears read-only and updates the shared memory 111 (y11). Then, the control node 1 sets the attribute of the shared memory 111 to read-only again. After that, the control node 1 refers to the shared memory information 1203-m and specifies an area of the shared memory 211 corresponding to the updated area of the shared memory 111. Then, the control node 1 checks the instruction execution status of the calculation process 200-m using the area of the shared memory 211 described above. After that, at the timing that the calculation process 200-m using the specified area of the shared memory 211 stops execution, the control node 1 uses the shared memory synchronization means 1302 to copy the update content of the data in the shared memory 111 to the shared memory 211 (y12).

Through the above processing, the shared memory 111 of the control node 1 and the shared memory 211 of the calculation node 2 are synchronized with each other in the latest state. Meanwhile, update of a file of the sharing source is performed by the memory mapped file function supported by the conventional OS (the control node OS 110).

As described above, the information processing device in this exemplary embodiment has the control node 1 in which an operating system is incorporated, and the calculation node 2 in which an operating system is not incorporated and which does not support precise exception. The shared memory 111 is created in the memory 11 of the control node 1, and the shared memory 211 is created in the memory 21 of the calculation node 2. While the calculation process 200-m stops execution, the substitution process 120-m of the control node 1 uses the shared memory synchronization means 1302 to perform synchronization of the shared memory 111 with the shared memory 211. Such a configuration allows synchronization of the shared memory 111 of the control node 1 with the shared memory 211 of the calculation node 2. As a result, the memory mapped file function can be used on the calculation node 2 including the CPU 22 that does not support precise exception, and memory sharing between the processes is allowed.

Further, the information processing device in this exemplary embodiment is configured to perform synchronization of the shared memory 111 with the shared memory 211 at the four timings described above. Such a configuration allows synchronization of the shared memory 111 with the shared memory 211 in the latest state.

In this exemplary embodiment, a case where the information processing device includes two nodes, the node 1 and the node 2, has been described. However, as described before, the information processing device may include three or more nodes. In other words, the information processing device may include one control node 1 and two or more calculation nodes 2. In this case, the shared memory synchronization means 1302 synchronizes each of the corresponding shared memories 211 with the shared memory 111.

Further, the method for reflecting update of the shared memory 211 of the calculation node 2 onto the control node 1 is not limited to the case described in this exemplary embodiment.

For example, in the page table 1101 of the processes sharing the shared memory 111 on the control node 1, the attribute of the page table entry 1102 of the shared memory 111 is preset to invalid. When the process on the control node 1 intends to access the shared memory 111, the page not present exception occurs. Then, during the exception handling, the content of the shared memory 211 on the calculation node 2 is copied to the shared memory 111 on the control node 1. It can be considered to reflect update of the shared memory 211 of the calculation node 2 onto the control node 1 by such a method, for example, in the case of using this method, it is not required to determine whether update of the shared memory 211 is memory update by a system call or memory update by a CPU instruction.

Further, it can also be considered that the calculation process 200-m explicitly executes on the program an instruction to copy the update content of the shared memory 211 to the shared memory 111, for example. In the case of using this method, it is not required to determine whether update of the shared memory 211 is memory update by a system call or memory update by a CPU instruction.

Further, the method for reflecting update of the shared memory 111 of the control node 1 onto the calculation node 2 is not limited to the case described in this exemplary embodiment.

For example, the information processing device is configured so that, at the timing that the calculation process 200-m stops execution, the substitution process 120-m examines the update status of the shared memory 111 on the control node 1. As an example of checking update of the shared memory 111, it can be conceived of to utilize Dirty bit of the page table entry 1102. Then, in a ease where the shared memory 111 has been updated, the control node 1 uses the shared memory synchronization means 1302 to copy the update content of the shared memory 111 to the shared memory 211. In the case of using this method, it is not required to determine whether update of the shared memory 211 is memory update by a system call or memory update by a CPU instruction.

[Second Exemplary Embodiment]

Next, a second exemplary embodiment of the present invention will be described with reference to FIG. 18. In this exemplary embodiment, a schematic configuration of an information processing device which has a main processor core and a sub processor core and performs synchronization of shared memories created on the respective cores will be described.

Figure 18:
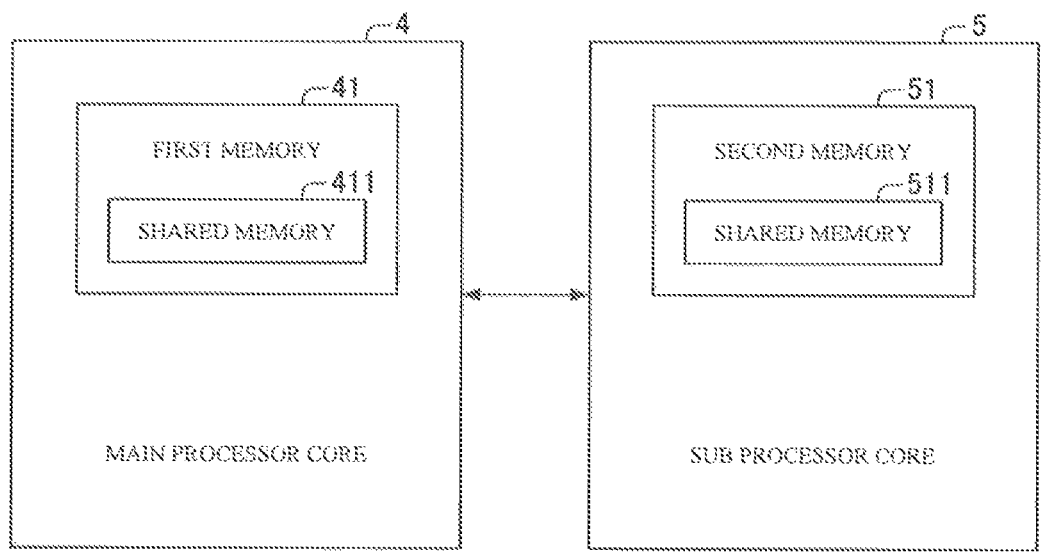
FIG. 18 is a schematic block diagram schematically showing a configuration of an information processing device according to a second exemplary embodiment of the present invention.

With reference to FIG. 18, the information processing device in this exemplary embodiment has a main processor core 4 in which an operating system is incorporated, and a sub processor core 5 which is controlled by the main processor core 4 and in which an operating system is not incorporated.

The main processor core 4 has a first memory 41. The sub processor core 5 has a second memory 51.

In the first memory 41 and the second memory 51, a shared memory 411 and a shared memory 511 which synchronize the contents of data of the first memory 41 and the second memory 51 are created, respectively. In other words, in the first memory 41, the shared memory 411 is created. In the second memory 51, the shared memory 511 is created. The shared memory 411 and the shared memory 511 synchronize the contents of the data with each other at a predetermined timing. To be specific, in this exemplary embodiment, while the sub processor core 5 stops running, the main processor core 4 synchronizes the data of the shared memory 411 with the data of the shared memory 511. Synchronization of the shared memory 411 with the shared memory 511 is performed through such processing, for example.

As described above, the information processing device in this exemplary embodiment has the main processor core 4 in which an operating system is incorporated, and the sub processor core 5 which is controlled by the main processor core 4 and in which an operating system is not incorporated. Further, the shared memory 411 is created in the first memory 41 included by the main processor core 4, and the shared memory 511 is created in the second memory 51 included by the sub processor core 5. The information processing device is configured so that the main processor core 4 synchronizes data of the shared memory 411 with data of the shared memory 511 while the sub processor core 5 stops running. Such a configuration allows synchronization of the shared memory 411 created in the main processor core 4 with the shared memory 511 created in the sub processor 5. Consequently, for example, it becomes possible to perform memory sharing between a process of the main processor core 4 and a process of the sub processor core 5.

An information processing method executed when the information processing device described above operates is an information processing method executed by an information processing device including: a main processor core 4 which has a first memory 41 and in which an operating system is incorporated; and a sub processor core 5 which has a second memory 51 and is controlled by the main processor core 4 and in which an operating system is not incorporated. In the first memory 41 and the second memory 51, a shared memory 411 and a shared memory 511 which share data between the first memory 41 and the second memory 51 are created, respectively. The information processing method is a method that the main processor core 4 synchronizes the shared memory 411 created in the first memory 41 with the shared memory 511 created in the second memory 51 while the sub processor core 5 stops running.

An invention of the information processing method having the configuration described above also has the same action as the information processing device, so that it can achieve the object of the present invention described before.

Figure 19:
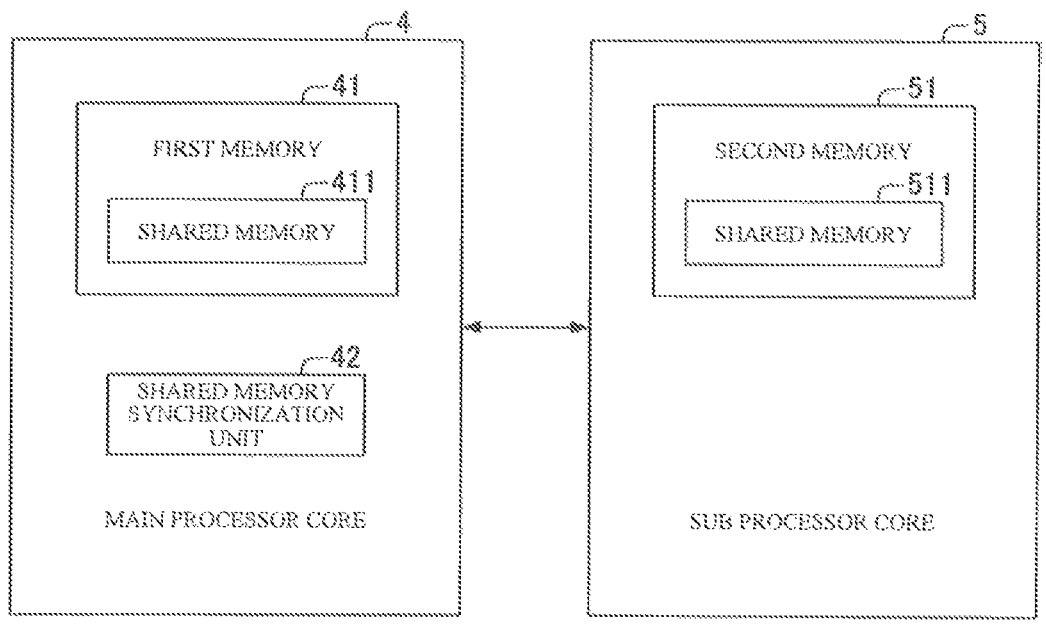
FIG. 19 is a schematic block diagram schematically showing another configuration of the information processing device according to the second exemplary embodiment of the present invention.

Further, for example, a main processor core 4 having a function to control a sub processor core 5 in which an operating system is not incorporated can also achieve the object of the present invention (see FIG. 19). The main processor core 4 has a first memory 41. A shared memory 411 sharing data with a second memory 51 included by the sub processor core 5 is created in the first memory 41. The main processor core 4 has a shared memory synchronization means 42 which synchronizes the shared memory 411 created in the first memory 41 with a shared memory 511 created in the second memory 51 while the sub processor core 5 stops running.

Further, the main processor core 4 described above can be realized by installing a program for causing a main processor core 4 to function as a shared memory synchronization means 42. The main processor core 4 has a first memory 41. A shared memory 411 sharing data with a second memory 51 included by a sub processor core 5 is created in the first memory 41. The main processor core 4 has a function to control the sub processor core 5 in which an operating system is not incorporated. The shared memory synchronization means 42 synchronizes the shared memory 411 created in the first memory 41 with a shared memory 511 created in the second memory 51 while the sub processor core 5 stops running.

Further, an information processing method executed when the main processor core 4 described above operates is an information processing method executed by a main processor core 4 having a function to control a sub processor core 5 in which an operating system is not incorporated. In the method, synchronization of a shared memory 411 created in a first memory 41 created in the main processor core 4 with a shared memory 511 created in a second memory 51 created in the sub processor core 5 is performed while the sub processor core 5 stops running.

Inventions of the program and information processing method having the configurations described above also have the same actions as the main processor core described above, so that they can achieve the object of the present invention described before.

<Supplementary Notes>

The whole or part of the exemplary embodiments disclosed above can be described as, but not limited to, the following supplementary notes.

(Supplementary Note 1)

An information processing device comprising a main processor core having a first memory and a sub processor core having a second memory and controlled by the main processor core, an operating system being incorporated in the main processor core, no operating system being incorporated in the sub processor core, wherein:

a shared memory area is formed in the first memory, a shared memory area is formed in the second memory, and data in the shared memory areas of the first and second memories are synchronized; and the main processor core is configured to synchronize the data in the shared memory areas formed in the first and second memories while the sub processor core stops operating.

(Supplementary Note 2)

The information processing device according to Supplementary Note 1, wherein:

the sub processor core is configured to request the main processor core to execute predetermined information processing, and also stop operating; and the main processor core is configured to, after executing the predetermined information processing requested by the sub processor core, copy data updated through the predetermined information processing in one of the shared memory areas into the other of the shared memory areas and then execute control to restart operation of the sub processor core.

(Supplementary Note 3)

The information processing device according to Supplementary Note 1 or 2, wherein:

the sub processor core is configured to request the main processor core to execute information processing, and also stop operating, the information processing being updating data in the shared memory area formed in the second memory; and the main processor core is configured to, after executing the information processing, which is updating the data in the shared memory area formed in the second memory, requested by the sub processor core, copy the updated data into the shared memory area formed in the first memory and then execute control to restart operation of the sub processor core.

(Supplementary Note 4)

The information processing device according to Supplementary Note 2 or 3, wherein the information processing is a system call.

(Supplementary Note 5)

The information processing device according to any of Supplementary Notes 1 to 4, wherein the main processor core is configured to, when the sub processor core stops operating, check whether or not data in the shared memory area formed in the second memory has been updated and copy the updated data in the shared memory area formed in the second memory into the shared memory area formed in the first memory.

(Supplementary Note 6)

The information processing device according to any of Supplementary Notes 1 to 5, wherein the main processor core is configured to, when the sub processor core stops operating, copy updated data in the shared memory area formed in the first memory into the shared memory area formed in the second memory.

(Supplementary Note 7)

The information processing device according to any of Supplementary Notes 1 to 6, wherein:

the sub processor core is configured to request the main processor core to form a shared memory area, and also stop operating; and the main processor core is configured to, in response to a request by the sub processor core, form the shared memory areas in the first and second memories and then execute control to restart operation of the sub processor core.

(Supplementary Note 8)

An information processing method executed by an information processing device comprising a main processor core having a first memory and a sub processor core having a second memory and controlled by the main processor core, an operating system being incorporated in the main processor core, no operating system being incorporated in the sub processor core, shared memory areas being formed in the first arid second memories, respectively, data in the shared memory areas of the first and second memories being synchronized, the information processing method comprising:

by the main processor core, synchronizing the data in the shared memory areas formed in the first and second memories while the sub processor core stops operating.

(Supplementary Note 9)

The information processing method according to Supplementary Note 8, comprising:

by the sub processor core, requesting the main processor core to execute predetermined information processing, and also stopping operating; and by the main processor core, after executing the predetermined information processing requested by the sub processor core, copying data updated through the predetermined information processing in one of the shared memory areas into the other of the shared memory areas and then executing control to restart operation of the sub processor core.

(Supplementary Note 9-1)

The information processing method according to Supplementary Note 9, comprising:

by the sub processor core, requesting the main processor core to execute information processing, and also stopping operating, the information processing being updating data in the shared memory area formed in the second memory; and by the main processor core, after executing the information processing, which is updating the data in the shared memory area formed in the second memory, requested by the sub processor core, copying the data in the shared memory area formed in the second memory updated through the information processing into the shared memory area formed in the first memory and then executing control to restart operation of the sub processor core.

(Supplementary Note 10)

A main processor core in which an operating system is incorporated, the main processor core having a function to control a sub processor core in which no operating system is incorporated, wherein:

a first memory is included;

a shared memory area is formed in the first memory, data in the shared memory area is synchronized with data in a second memory included by the sub processor core; and a shared memory synchronization means is included, the shared memory synchronization means being configured to synchronize the data in the shared memory area formed in the first memory with data in a shared memory area formed in the second memory while the sub processor core stops operating.

(Supplementary Note 10-1)

The main processor core according to Supplementary Note 10, wherein, after predetermined information processing is executed in response to a request by the sub processor core, data updated through the predetermined information processing in one of the shared memory areas is copied into the other of the shared memory areas by using the shared memory synchronization means and then control to restart operation of the sub processor core is executed.

(Supplementary Note 10-2)

The main processor core according to Supplementary Note 10-1, wherein, after information processing to update the data in the shared memory area formed in the second memory is executed in response to a request by the sub processor core, the data in the shared memory area formed in the second memory updated through the information processing is copied into the shared memory area formed in the first memory by using the shared memory synchronization means and then control to restart operation of the sub processor core is executed.

(Supplementary Note 11)

A program comprising instructions for causing a main processor core to function as a shared memory synchronization means, wherein:

the main processor core has a first memory and has a function to control a sub processor core, a shared memory area is formed in the first memory, data in the shared memory is synchronized with data in a second memory included by the sub processor core, an operating system is incorporated in the main processor core, and no operating system is incorporated in the sub processor core; and the shared memory synchronization means is configured to synchronize the data in the shared memory area formed in the first memory with data in a shared memory area formed in the second memory while the sub processor core stops operating.

(Supplementary Note 11-1)

The program according to Supplementary Note 11, comprising instructions for, after execution of predetermined information processing in response to a request by the sub processor core, causing the shared memory synchronization means to copy data updated through the predetermined information processing in one of the shared memory areas into the other of the shared memory areas and then execute control to restart operation of the sub processor core.

(Supplementary Note 11-2)

The program according to Supplementary Note 11 or 11-1, comprising instructions for, after execution of information processing to update the data in the shared memory area formed in the second memory in response to a request by the sub processor core, causing the shared memory synchronization means to copy the data in the shared memory area formed in the second memory updated through the information processing into the shared memory area formed in the first memory and then execute control to restart operation of the sub processor core.

(Supplementary Note 12)

An information processing method executed by a main processor core in which an operating system is incorporated, the main processor core having a function to control a sub processor core in which no operating system is incorporated, the information processing method comprising synchronizing data in a shared memory area formed in a first memory included by the main processor core with data in a shared memory area formed in a second memory included by the sub processor core while the sub processor core stops operating.

(Supplementary Note 12-1)

The information processing method according to Supplementary Note 12, comprising, after executing predetermined information processing in response to a request by the sub processor core, copying data updated through the predetermined information processing in one of the shared memory areas into the other of the shared memory areas and then executing control to restart operation of the sub processor core.

(Supplementary Note 12-2)

The information processing method according to Supplementary Note 12 or 12-1, comprising, after executing information processing, which is updating the data in the shared memory area formed in the second memory, in response to a request by the sub processor core, copying the data its the shared memory area formed in the second memory updated through the information processing into the shared memory area formed in the first memory and then executing control to restart operation of the sub processor core.

(Supplementary Note 13)

A sub processor core controlled by a main processor core in which an operating system is incorporated, no operating system being incorporated in the sub processor core, wherein:

a second memory is included;

a shared memory area is formed in the second memory, data in the shared memory area is synchronized with data in a first memory included by the main processor core; and the data in the shared memory area formed in the second memory is synchronized with data in a shared memory area formed in the first memory while the sub processor core stops operating.

The program described in the exemplary embodiments and supplementary notes described above is stored in a storage device or recorded on a computer-readable recording medium. For example, the recording medium is a portable medium such as a flexible disk, an optical disk, a magneto-optical disk, and a semiconductor memory.

While the present invention has been described with reference to the exemplary embodiments thereof, the present invention is not limited to these exemplary embodiments. Various changes in form and details of the present invention that can be understood by those skilled in the art may be made within the scope of the present invention.

The present invention is based upon and claims the benefit of priority from Japanese patent application No. 2015-030566, filed on Feb. 19, 2015, the disclosure of which is incorporated herein in its entirety by reference.

DESCRIPTION OF REFERENCE NUMERALS

1 node, control node
2 node, calculation node
11, 21 memory
12, 22 CPU
13, 23 data transfer means
14, 24 processor core
(24 calculation core)
15, 25 DMA engine
16, 26 to-CPU communication function
240 general-purpose register set
241 control register set
242 exception detection means
243 register set access means
244 exception notification means
110 control node OS
1101 page table
1102 page table entry
1103 memory attribute setting means
1104 system call
120 substitution process
1201 memory update substitutional execution means
1202 memory mapping substitutional execution means
1203 shared memory information
111, 211 shared memory
130 calculation node management means
1301 calculation node memory update check means
1302 shared memory synchronization means
1303 process correspondence table
13031 substitution process ID
13032 calculation core number
200 calculation process
201 shared memory update identifier
210 process image
4 main processor core
41 first memory
411 shared memory
42 shared memory synchronization means
5 sub processor core
51 second memory
511 shared memory

The invention claimed is:

1. An information processing device comprising:
a control node including a first memory and a first CPU (Central Processing Unit), the control node is configured to function as an operating system; and
a calculation node including a second memory and a second CPU, the calculation node is not configured to function as an operating system and is controlled by the control node, wherein:
the control node includes a management unit configured to manage the calculation node and provide the calculation node with a function provided by the operating system,
the calculation node requests the control node to form a first shared memory area and a second shared memory area, and also stops operating,
the control node, in response to a request by the calculation node, forms the first shared memory area in the first memory of the control node, forms the second shared memory area in the second memory of the calculation node, and, after copying a content of the first memory of the control node to the second memo of the calculation node, executes control to restart operation of the calculation node, and
the control node includes a shared memory synchronization unit that synchronizes, while the calculation node stops operating, data in the first shared memory area formed in the first memory and data in the second shared memory area formed in the second memory, by copying an update content of the data in the first shared memory area to the second shared memory area, or by copying an update content of the data in the second shared memory area to the first shared memory area.

2. The information processing device according to claim 1, wherein:
the calculation node is configured to request the control node to execute predetermined information processing, and also stop operating; and
the control node is configured to, after executing the predetermined information processing requested by the calculation node, copy data updated through the predetermined information processing in one of the shared memory areas into the other of the shared memory areas and then execute control to restart operation of the calculation node.

3. The information processing device according to claim 1, wherein:
the calculation node is configured to request the control node to execute information processing, and also stop operating, the information processing being updating data in the second shared memory area formed in the second memory; and
the control node is configured to, after executing the information processing requested by the calculation node, copy the data in the second shared memory area formed in the second memory updated through the information processing into the first shared memory area formed in the first memory and then execute control to restart operation of the calculation node, the information processing being updating the data in the second shared memory area formed in the second memory.

4. The information processing device according to claim 2, wherein the information processing is a system call.

5. The information processing device according to claim 1, wherein the control node is configured to, when the calculation node stops operating, check whether or not data in the second shared memory area formed in the second memory has been updated and copy the updated data in the second shared memory area formed in the second memory into the first shared memory area formed in the first memory.

6. The information processing device according to claim 1, wherein the control node is configured to, when the calculation node stops operating, copy updated data in the first shared memory area formed in the first memory into the second shared memory area formed in the second memory.

7. An information processing method executed by an information processing device,
the information processing device comprising:
a control node including a first memory and a first CPU, the control node is configured to function as an operating system; and
a calculation node including a second memory and a second CPU, the calculation node is not configured to function as an operating system and is controlled by the control node, wherein:
the control node includes a management unit configured to manage the calculation node and provide the calculation node with a function provided by the operating system,
the calculation node requests the control node to form a first shared memory area and a second shared memory area, and also stops operating,
the control node, in response to a request by the calculation node, forms the first shared memory area in the first memory of the control node, forms the second shared memory area in the second memory of the calculation node and, after copying a content of the first memory of the control node to the second memory of the calculation node, executes control to restart operation of the calculation node,
the information processing method comprising:
synchronizing, by the control node, while the calculation node stops operating, data in the first shared memory area formed in the first memory and data in the second shared memory area formed in the second memory, by copying an update content of the data in the first shared memory area to the second shared memory area, or copying an update content of the data in the second shared memory area to the first shared memory area.

8. The information processing method according to claim 7, further comprising:
requesting, by the calculation node, the control node to execute predetermined information processing;
stopping, by the calculation node, an operation; and
copying, by the control node, after executing the predetermined information processing requested by the calculation node, data updated through the predetermined information processing in one of the shared memory areas into the other of the shared memory areas and then executing control to restart operation of the calculation node.

9. A control node in which an operating system is incorporated, the control node comprising:
a first memory; and
a first CPU, wherein:
the control node is configured to control a calculation node in which no operating system is incorporated,
the control node includes a management unit configured to manage the calculation node and provide the calculation node with a function provided by the operating system, the calculation node requests the control node to form a first shared memory area and a second shared memory area, and also stops operating, the control node, in response to a request by the calculation node, forms the first shared memory area in the first memory of the control node, forms the second shared memory area in the second memory of the calculation node, and, after copying a content of the first memory of the control node to the second memory of the calculation node, executes control to restart operation of the calculation node, and the control node includes a shared memory synchronization unit that synchronizes, while the calculation node stops operating, data in the first shared memory area formed in the first memory with data in the second shared memory area formed in the second memory, by copying an update content of the data in the first shared memory area to the second shared memory area, or copying an update content of the data in the second shared memory area to the first shared memory area.

* * * * *

UNITED STATES PATENT AND TRADEMARK OFFICE
CERTIFICATE OF CORRECTION

PATENT NO. : 10,565,135 B2
APPLICATION NO. : 15/552179
DATED : February 18, 2020
INVENTOR(S) : Kawahara Page 1 of 1

It is certified that error appears in the above-identified patent and that said Letters Patent is hereby corrected as shown below:

In the Claims

Claim 1, Column 23, Line 22, "the second memo of" should read --the second memory of--

Signed and Sealed this
Eleventh Day of August, 2020

Andrei Iancu
*Director of the United States Patent and Trademark Office*